(12) United States Patent
Greenfield et al.

(10) Patent No.: US 7,010,523 B2
(45) Date of Patent: *Mar. 7, 2006

(54) SYSTEM AND METHOD FOR ONLINE ANALYTICAL PROCESSING

(75) Inventors: David Greenfield, Waltham, MA (US);
Geof Fred Lyon, Rockport, MA (US);
Ron Vogl, Cambridge, MA (US); Scott Feinstein, Peabody, MA (US)

(73) Assignee: Oracle International Corporation, Redwood Shores, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 10/738,789

(22) Filed: Dec. 17, 2003

(65) Prior Publication Data

US 2004/0133552 A1    Jul. 8, 2004

Related U.S. Application Data

(63) Continuation of application No. 09/918,712, filed on Aug. 1, 2001, now Pat. No. 6,684,207.

(60) Provisional application No. 60/222,088, filed on Aug. 1, 2000.

(51) Int. Cl.
*G06F 17/30* (2006.01)
(52) U.S. Cl. ............................................. 707/3; 707/2
(58) Field of Classification Search .................... 707/2, 707/3, 4, 5, 6, 10, 102, 104.1; 709/200, 217; 715/501.1; 171/104
See application file for complete search history.

(56) References Cited

U.S. PATENT DOCUMENTS

| | | | |
|---|---|---|---|
| 6,094,655 A * | 7/2000 | Rogers et al. | 707/10 |
| 6,363,393 B1 * | 3/2002 | Ribitzky | 707/102 |
| 6,684,207 B1 * | 1/2004 | Greenfield et al. | 707/3 |

OTHER PUBLICATIONS

Chaudhuri et al., An Overview of Data Warehousing and OLAP Technology, SIGMOD Record 1997, pp. 1-11.*
Qian et al., Translating Object-Oriented Queries to Relational Queries, Mar. 11, 1994, pp. 1-18.*
Buzydlowski et al., A Framework for Object-Oriented On-Line Analytic Processing, ACM 1999, pp. 10-15.*
Jan W. Buzydlowski et al. A Framework for Object-Oriented On-Line Analytic Processing, DOLAP '98 Washington DC USA, ACM 1999.
George Colhat OLAP, Relational, and Multidimensional Database Systems, ACM Sigmod Record, vol. 25, Sep. 1996.
Surajit Chaudhuri, An Overview of Data Warehousing and OLAP Technology.

* cited by examiner

*Primary Examiner*—Apu M. Mofiz
(74) *Attorney, Agent, or Firm*—Swidler Berlin LLP

(57) ABSTRACT

A system and method for analyzing data is described, in which an application programming interface (API) is provided to permit an online analytical processing (OLAP) application to manipulate data and queries in a model close to the business model the OLAP application was designed to support. A data server is provided to translate between the object-oriented representation and the native database query format. In one embodiment, a multidimensional virtual cursor is implemented to further simplify the logic of the OLAP application.

10 Claims, 7 Drawing Sheets

|   | A | B | C | D |
|---|---|---|---|---|
| X | 101 | 102 | 103 | 104 |
| Y | 105 | 106 | 107 | 108 |
| Z | 109 | 110 | 112 | 113 |

FIG. 6A

| Cube Position = 1<br>Column Dim = "A"<br>Row Dim = "X"<br>Measure Value = 101 | Cube Position = 2<br>Column Dim = "B"<br>Row Dim = "X"<br>Measure Value = 102 | Cube Position = 3<br>Column Dim = "C"<br>Row Dim = "X"<br>Measure Value = 103 | Cube Position = 4<br>Column Dim = "D"<br>Row Dim = "X"<br>Measure Value = 104 |
|---|---|---|---|
| Cube Position = 5<br>Column Dim = "A"<br>Row Dim = "Y"<br>Measure Value = 105 | Cube Position = 6<br>Column Dim = "B"<br>Row Dim = "Y"<br>Measure Value = 106 | Cube Position = 7<br>Column Dim = "C"<br>Row Dim = "Y"<br>Measure Value = 107 | Cube Position = 8<br>Column Dim = "D"<br>Row Dim = "Y"<br>Measure Value = 108 |
| Cube Position = 9<br>Column Dim = "A"<br>Row Dim = "Z"<br>Measure Value = 109 | Cube Position = 10<br>Column Dim = "B"<br>Row Dim = "Z"<br>Measure Value = 110 | Cube Position = 11<br>Column Dim = "C"<br>Row Dim = "Z"<br>Measure Value = 111 | Cube Position = 12<br>Column Dim = "D"<br>Row Dim = "Z"<br>Measure Value = 112 |

FIG. 6B

SYSTEM AND METHOD FOR ONLINE ANALYTICAL PROCESSING

RELATED APPLICATIONS

The present application is a continuation of U.S. application Ser. No. 09/918,712, filed Aug. 1, 2001, U.S. Pat. No. 6,684,207, which claims the benefit of U.S. Provisional Patent Application Ser. No. 60/222,088 filed on Aug. 1, 2000, the contents of which are hereby incorporated by reference.

FIELD OF THE INVENTION

The present invention relates to database systems and more particularly to online analytical processing (OLAP) systems.

BACKGROUND OF THE INVENTION

Relational databases have become the dominant database technology for providing online transactional processing (OLTP) capabilities that are essential for businesses to keep track of their sales, transactions, and other affairs. Designed for efficient selection, storage, and retrieval of data, relational databases are ideal for housing gigabytes of detailed data in data warehouses. As a result, data warehouses contain a wealth of data that can yield, after analysis, critical information about a business, such as sales trends and product line profitability. This information can provide a crucial edge in an increasingly competitive marketplace.

The challenge is in deriving answers to business questions from the available data, so that decision makers at all levels in the business can respond quickly to changes in the business climate. While a standard transactional query might ask, "When did order 84305 ship?", an analytical query might ask, "How do sales in the Southwestern region for this month compare with plan or with sales a year ago?" The first question involves simple data selection and retrieval easily performed by relational database systems; however, the second question involves inter-row calculations, time series analysis, and access to aggregated historical and current data.

The data processing required to answer analytical questions is fundamentally different from the data processing required to answer transactional questions. This data processing is known as online analytical processing (OLAP). An OLAP application is a computer program designed to access the company's raw data, process the data, and present the data to the company's data analysts. Because of the sophisticated nature of this analysis, OLAP applications can be quite difficult to develop and implement.

For example, end users, such as the company's analysts, think in the business terms, but the relational databases that store information for the data warehouses deal with such low-level technical concepts as tables and columns. Current data access methods for OLAP applications provide a concrete view on the data in the data warehouse, forcing users to learn too much about the internal design of the database system that houses the data to be analyzed.

As another example, the process of analyzing data is iterative. Users begin with a simple query, examine the result, modify the query slightly to highlight an element of interest, and then examine the new results of the modified query. This process of incremental modification is often repeated for many cycles. However, data access methods in common use today employ textual query languages such as SQL (Structured Query Language), which requires the entire query to be resubmitted each time even though the bulk of the query is unchanged but with minor variations.

Furthermore, a logical starting point for analysis very often requires a large amount of data, e.g. millions of rows, which makes retrieval of the entire result set impractical, especially over a computer network. As a result, present OLAP applications are forced to constrain each query submitted to the data warehouse to limit the number of possible rows that can be returned to a manageable level. This approach also requires the submission of many similar queries, differing only in minor variations, to the data warehouse.

Another manner in which the business model differs from the relational database model is in the representation of the result sets obtained from the data warehouse in response to queries. Relational databases typically present a tabular representation of the result set, but business analysts prefer to see the data in a cross-tab representation, in which the contrasts and relationships between the factors of the data are more easily seen.

To the extent that current software addresses these issues, they are dealt with in the application tier. Accordingly, the OLAP application itself is programmed to model the business and translate between the business model and the physical database concepts as necessary. In this approach, the OLAP application has to be able to generate hundreds of similar queries and cache the results. Furthermore, the results have to be formatted into a visual representation desired by the business analyst.

Programming these tasks results in very sophisticated and bulky OLAP applications, which are consequently unsuitable for any platform but the most powerful and expensive. Furthermore, bulky application logic is difficult and expensive to maintain and upgrade, making it difficult for business to adapt quickly to changing market conditions. As a result, there is an acute need for an OLAP solution that permits inexpensive, lightweight OLAP applications that can efficiently handle the incremental refinement of queries, management of large result sets, and lessen the mismatch between the business model and the relational database model.

SUMMARY OF THE INVENTION

The present invention addresses these and other vital needs by employing several features singly and in combination, including an object-oriented query representation, deployment of an OLAP data server apart from the OLAP application, and a multidimensional virtual cursor.

One aspect of the invention involves the specification and construction of queries in the OLAP application in an object-oriented representation rather than by a textual query such as SQL. The query objects resemble the business model of the OLAP application rather than the relational database model of the data warehouse. The execution of the query objects can be performed by a separate data server for providing the OLAP services, with the OLAP application holding remote references to the query objects. More specifically, the objects represent the query state, and the OLAP application refines the queries by invoking methods on the query objects. These actions cause corresponding methods to be invoked on the data server objects remotely. In this configuration, the data server can easily determine how the query has been altered and thus perform any conversions necessary between the object representation and the relational database's own query representation without encumbering the OLAP application itself.

Another aspect of the invention relates to a multidimensional, virtual cursor, which presents a cross tab representation of the result set from executing a query instead of a flat table. The OLAP application specifies the cursor size and then navigates to the cells that are to be displayed by specifying positions (such as Cartesian coordinates) on the edges of the multidimensional result set. Furthermore, the OLAP application is provided only with the cells that are really needed, which can be a tiny subset of the entire logical result set embodied by the query. In yet another aspect, subtransactions are employed to facilitate a what-if analysis and other kinds of query refinement, by allowing portions of queries to be selectively rolled back.

Accordingly, a system and method for analysis of data is described in which the complex task of translating between a business model and the relational database schema is performed by a data server. This approach greatly simplifies the responsibilities of the OLAP application, enabling OLAP application developers to focus on the business problem itself, thereby to deliver better applications faster. Because this translation is common to all applications that use the analytic capabilities of the data server, the effort going into implementing the data server is leveraged effectively across many OLAP applications. Query refinement methods that execute in the data server reflect explicitly how a query is refined. Thus, the data server, rather than the application, chooses how to efficiently manage the query refinements. Furthermore, the implementation in the data server is close to the data. Calculations are performed within the data server, and only the requested summary-level data need be returned to the OLAP application.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 6A and 6B are diagrams illustrating a cross-tab arrangement of a result set for one embodiment of the present invention.

DESCRIPTION OF THE PREFERRED EMBODIMENT

Figure 1:
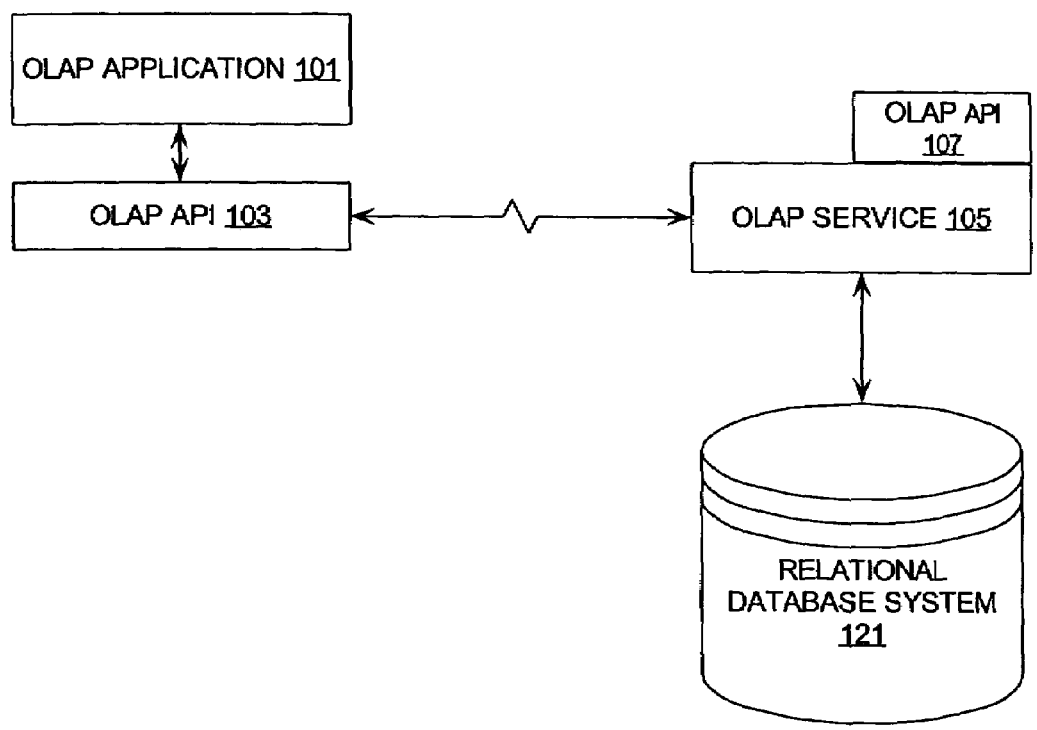
FIG. 1 depicts the software architecture of one embodiment of the present invention.

A system, method, and software for data analysis are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Conceptual Overview

OLAP applications are based on a multidimensional view of data stored in a data warehouse and work with queries that represent selections of data. The following definitions introduce concepts that reflect the multidimensional view and are basic to OLAP:

A "dimension" is a structure that categorizes data. Commonly used dimensions include customer, product, and time. Typically, a dimension is associated with one or more hierarchies. Several distinct dimensions, combined with measures, enable end users to answer business questions. For example, a Time dimension that categorizes data by month helps to answer the question, "Did we sell more widgets in January or June?"

A "measure" includes data, usually numeric and additive, that can be examined and analyzed. Typically, a given measure is categorized by one or more dimensions, and it is described as "dimensioned by" them.

A "hierarchy" is a logical structure that uses ordered levels as a means of organizing dimension elements in parent-child relationships. Typically, end users can expand or collapse the hierarchy by drilling down or up on its levels.

A "level" is a position in a hierarchy. For example, a time dimension might have a hierarchy that represents data at the day, month, quarter, and year levels.

An "attribute" is a descriptive characteristic of the elements of a dimension that an end user can specify to select data. For example, end users might choose products using a Color attribute. Some attributes can represent keys or relationships into other tables.

A "query" is a specification for a particular set of data, which is referred to as the query's result set. The specification may require selecting, aggregating, calculating, or otherwise manipulating data. If such manipulation is required, it is an intrinsic part of the query.

A "schema" is a collection of relational database objects. Two types of schemas are characteristic of a data warehouse: a star schema and a snowflake schema. A star schema comprises one or more fact tables related to one or more dimension tables. The relationships are defined through foreign keys and metadata. A snowflake schema is a star schema that has been partially or fully normalized to reduce the number of duplicate values in the dimension tables.

For example, a star schema might have a single Geography dimension table with four columns: City, State, Region, and Country. Only the City column has predominately unique values, while the other columns have increasing numbers of duplicate values. A snowflake schema might have three related geography dimension tables: One table with two columns (City and State) that define the relationship between cities and states, a second table with two columns (State and Country) that define the relationship between states and countries, and a third table with two columns (Region and Country) that define the relationship between regions and countries.

A "cube" is a logical organization of multidimensional data. Typically, the edges of a cube contain dimension values, and the body of a cube contains measure values. For example, sales data can be organized into a cube whose edges contain values from the time, product, and customer dimensions and whose body contains values from the sales measure.

An "edge" is one side of a cube. Each edge contains values from one or more dimensions. Although there is no limit to the number of edges on a cube, data is often organized for display purposes along three edges, which are referred to as the row edge, column edge, and page edge.

Metadata

Typically, an OLAP application employs a different conceptual model than that of the relational database that warehouses the information to be analyzed. Therefore, when the OLAP application runs, the required data is fetched from the relational database 121 and converted into a multidimensional form that the OLAP application can use. For the data to be fetched and processed correctly, the relational database columns that are to be fetched and the role of those columns must be identified. This identification is made by metadata.

Metadata is data that describes the data and objects in the relational database 121 for fetching and computing the data correctly. Generally, metadata can be taken to mean the fact that a data source exists, as well as the structure and characteristics of the data in that data source. For example, the facts that a unitsSold measure exists, that the unitsSold measure contains numeric values, and that the unitsSold measure is dimensioned by geography and product are considered metadata. By contrast, the fact that 30 widgets were sold in 1998 in Tallahassee, Fla. is considered to be data. Concerning dimension members, the facts that a geography dimension exists and that it contains string values as members are other examples of metadata, but the fact that geography contains the particular string "Tallahassee, Fla." is data. Similarly, the fact that there is a hierarchy called standard defined against geography, and that it contains three levels called city, state, and region, are all considered metadata, but the fact that "Tallahassee, Fla." is a child of "Fla." is considered to be data.

Accordingly, metadata is used to inform the OLAP application 101 about the data that is available within the relational database 121 in a manner so that the OLAP application 101 can define multidimensional objects for analysis. When the OLAP application 101 runs, the OLAP application 101 instantiates these multidimensional objects and populates them with data fetched from the database.

The basic data model in a relational database is a table comprising one or more columns of data. All of the data in a relational database table is stored in columns. In contrast, the basic multidimensional data model is a cube, which comprises measures, dimensions, and attributes. Accordingly, it is important to identify whether the data from a particular column in the relational database will function as a measure, a dimension, or an attribute in the multidimensional form. In addition, it is important to have the metadata identify which columns are keys for indexing and fetching data from the relational database tables. These decisions are stored as metadata and constraints.

More specifically, the metadata will define the multidimensional measures to correspond to the facts stored in relational database tables. The term "fact" is typically used in relational databases, and the term "measure" is typically used in multidimensional applications. Measures are thus located in fact tables. A fact table typically has two types of columns: measures (or facts) and foreign keys to dimension tables. Measures contain the data to be analyzed, such as Sales or Cost. One implementation of the present invention requires that a column have a numerical or date data type to be identified as a measure. Most frequently, a measure is numerical and additive. One or more columns in the dimension tables form constraints on the fact tables. These constraints are defined by foreign keys in the fact tables, by the metadata, or both.

Dimensions identify and categorize the OLAP application's data. In a relational database system, dimension members are stored in a dimension table. Each column represents a particular level in a hierarchy. In a star schema, the columns are all in the same table; in a snowflake schema, the columns are in separate tables for each level. Because measures are typically multidimensional, a single value in a measure must be qualified by a member of each dimension to be meaningful. For example, a Sales measure might have dimensions for Product, Geographic Area, and Time. A value in the Sales measure (37854) is only meaningful when it is qualified by a product (DVD Player), a geographic area (Pacific Rim), and Time (March 2001). Defining a dimension in the data warehouse creates a database dimension object, in addition to creating metadata. A dimension object contains the details of the parent-child relationship between columns in a dimension table; it does not contain data. The database dimension object is used by the Summary Advisor and query rewrite to optimize the data warehouse. However, on the multidimensional side, a dimension does contain data, such as the names of individual products, geographic areas, and time periods. The OLAP API uses the metadata, dimension objects, and dimension tables to construct its dimensions.

A hierarchy is a way to organize data according to levels. Dimensions are structured hierarchically so that data at different levels of aggregation can be manipulated together efficiently for analysis and display. Each dimension must have at least one level. Each level represents a position in the hierarchy. Levels group the data for aggregation and are used internally for computation. Each level above the base (or lowest) level represents the aggregate total of the levels below it. For example, a Time dimension might have Day, Week, Quarter, and Year for the levels of a Time dimension hierarchy. If data for the Sales measure is stored in days, then the higher levels of the Time dimension allow the Sales data to be aggregated correctly into weeks, quarters, and years. The members of a hierarchy at different levels have a one-to-many parent-child relationship. For example, "QTR1" and "QTR2" are the children of "YR2001," thus "YR2001" is the parent of "QTR1" and "QTR2". If more than one hierarchy is defined for a dimension, then the hierarchies must have the same base level. For example, two hierarchies might be defined for a Time dimension, one for the calendar year and another for the fiscal year. Both hierarchies would use Day for the base level. All levels of a dimension are stored in dimension tables. A dimension can have multiple hierarchies, but all of them must have the same base level. The values of that level are stored in the key used to join the dimension table to a fact table.

Attributes provide supplementary information about the dimension members at a particular level. Attributes are often used for display, since the dimension members themselves may be meaningless, such as a value of "T296" for a time period. For example, there might be columns for employee number (ENUM), last name (LAST_NAME), first name (FIRST_NAME), and telephone extension (TELNO). ENUM is the best choice for a level, since it is a key column and its values uniquely identify the employees. ENUM also has a NUMBER data type, which makes it more efficient than a text column for the creation of indexes. LAST_NAME, FIRST_NAME, and TELNO are attributes. Even though they are dimensioned by ENUM, they do not make suitable measures because they are descriptive text rather than business measurements. Attributes are associated with a particular level of a dimension hierarchy and must be stored in the same table as that level.

Architectural Overview

FIG. 1 is an architectural diagram illustrating an embodiment of the present invention involving an online analytical processing (OLAP) application 101 that is programmed to access and analyze the data stored in a relational database system 121. The online analytical processing (OLAP) application 101 can be deployed in a thin client or a thick client configuration. In a typical thin client configuration, the user interface is handled by a Java™ application running in a browser or directly in a Java™ runtime environment and in communication with an application server, which is responsible for the main, business logic of the OLAP application 101. While the Java application and the application server are commonly deployed on different platforms in the thin client configuration, the OLAP application 101 in a thick client configuration is generally responsible for both the user interface and the business logic of the application.

The OLAP application 101 interacts with client software belonging to a online analytical processing application program interface (OLAP API) 103, which is responsible for presenting and managing an object oriented interface to the OLAP application 101 in accordance with a source model that is conceptually much closer to the business model of the OLAP application 101 than a typical relational database model. In one implementation, the OLAP API 103 client software is a set of Java packages containing classes that implement the programming interface to an OLAP service. The OLAP application 101 calls the methods on these classes for discovering, querying, processing, and retrieving data.

More specifically, the OLAP API 103 is also responsible for initiating and buffering communications with an OLAP service 105 operating as a data server, for example, over a network connection using the hypertext transfer protocol (HTTP). As described in greater detail hereinafter, the functions of the OLAP API include presenting an object-oriented interface to the OLAP application 101, caching metadata describing the data in the relational database 121 in multidimensional terms and portions of result sets returned to the OLAP application 101 for the relational database, and formatting the data in a cross-tabulation form.

The OLAP API 103 is the programming interface for OLAP services. When the OLAP application 101 calls methods on OLAP API 103 classes, the OLAP application 101 uses client software of the OLAP API 103 to communicate with the OLAP service 105, which typically resides on a different platform. The OLAP service module 105 and the relational database management system 121 reside on a data server tier, where the data is stored, selected, and manipulated. Specifically, the OLAP service 105 is a child process of an instance of the relational database system 121, and the communication between the OLAP API 103 client software and the OLAP service 105 is provided through a protocol such as the Common Object Request Broker Architecture (CORBA).

The OLAP service 105 is responsible for receiving and processing requests submitted by the OLAP API 103. The OLAP service 105's responsibilities include translating and formulating relational database queries to the relational database system 121 based on query objects supplied by the OLAP API 103, performing any calculations on the retrieved data including totaling and other forms of aggregation, and batching results for transmission back to the OLAP API 103 on a request-by-request basis to present a virtual result set to the OLAP API 103.

The OLAP API 103 need not be connected to the OLAP service 105 by a network connection, and FIG. 1 shows a local OLAP API 107 interacting directly with the OLAP service 105. Therefore, the OLAP application 101, which uses the OLAP API 103 client software (that is, calls methods in OLAP API classes), can reside on a single computer, or it can be divided into separate parts on different computers. For example, the end-user portion can be separate from the portion that makes OLAP API 103 calls. In this case, software on three computers would be involved.

OLAP Queries

For most OLAP applications, it is a very rare thing to have a final definitive query. Instead, each query can be seen as a springboard from which to dive into deeper exploration. Summary information can be expanded to include details of interest, while details can be summarized to reveal large scale trends. Even a fixed set of data can be viewed from many perspectives—pages can become columns, and dimensions that are nested in rows can be pivoted onto pages.

In accordance with this approach, a query is modeled as an object that represents a data request whose definition can be incrementally modified even after the query has been used to fetch data. For example, a query can be sorted, filtered, and then sorted again. Each time the query is modified, the query changes state.

Figure 2:
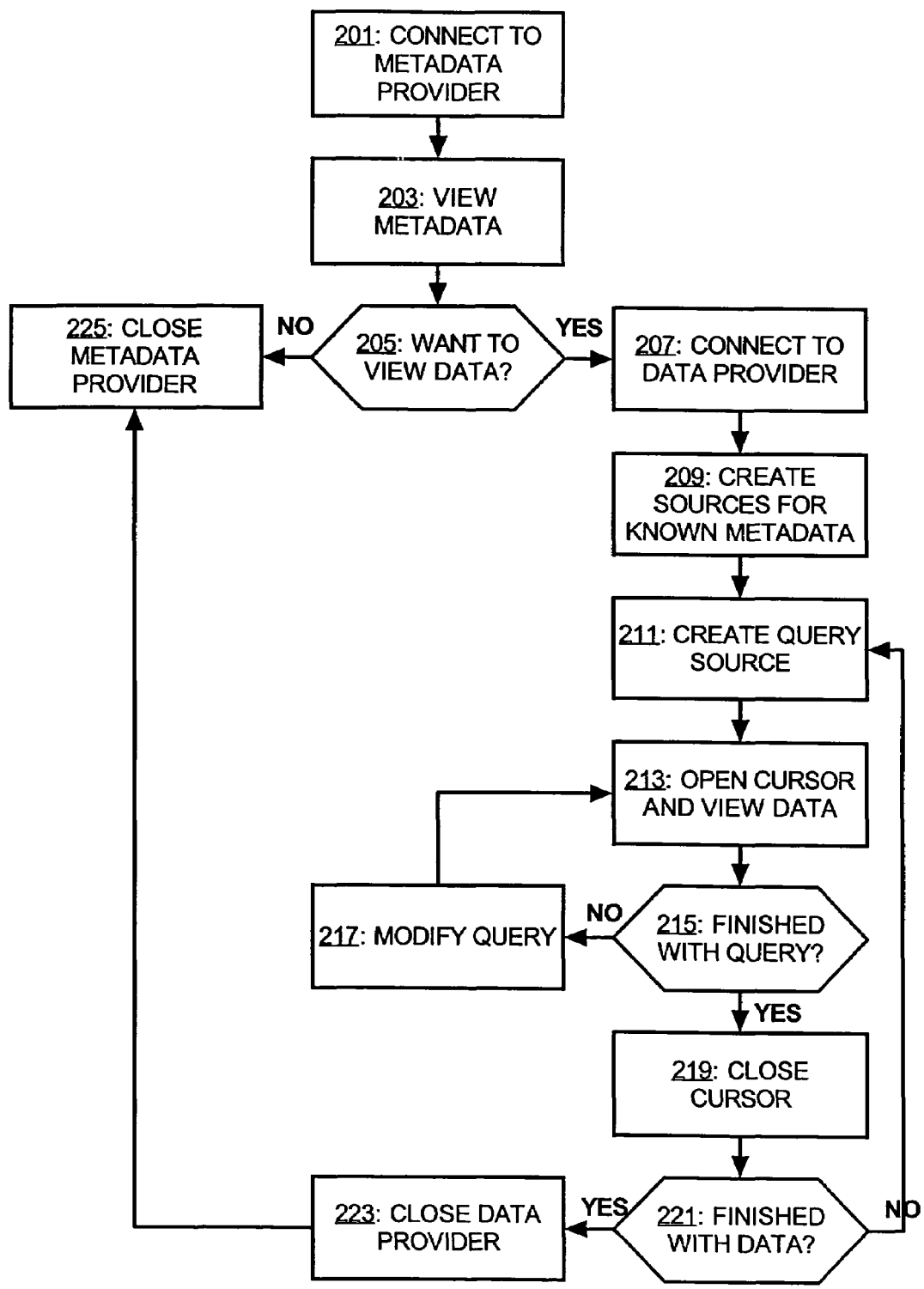
FIG. 2 is a flowchart of a process for incremental refinement of a query for one embodiment of the present invention.

FIG. 2 is a flowchart illustrating the life cycle of an OLAP query in accordance with one embodiment of the present invention. The OLAP application 101 begins by connecting to a metadata provider (step 201) and viewing the metadata (step 203). As described in more detail hereinafter, a metadata provider is responsible for obtaining the metadata from the relational database 121. If the client running the OLAP application 101 wishes to view the real data (tested at step 205), then the OLAP application 101, in response, connects to another object called a data provider (step 207). Upon connection, the client creates objects called sources, which are used by the OLAP API 103 to construct and represent queries. Typically, the client creates many sources, beginning with one that represents the basic metadata objects that are found in the relational database 121 (step 209). For example, the client might create a query by specifying a subset of the values in a basic measure.

Once the source representing the query has been created (step 211), the end user will typically want to see the results of the query. As described in more detail hereinafter, this operation is done by opening a cursor to view the data (step 213). Cursors are used to get the physical data from the relational database server 121 to the OLAP application 101.

These cursors bear some resemblance to SQL cursors, but, significantly, are multidimensional in form.

At this point, there is a decision point (step 215). On one hand, the end user might be happy with what was returned from the relational database 121, in which case the OLAP application 101 closes the cursor (step 219). On the other hand, the end user may wish to modify the query in some way. To do this operation, the OLAP application 101 directly modifies the source or template that defines the query (step 217) and then opens a new cursor and displays the new results (step 213). This procedure, in which the query changes states, can be repeated many times indefinitely.

Conceptually, this behavior fits well with end-user expectations, but there is also another advantage to the server by modeling queries in this way. Typically, each change to a query definition is small, so it generally takes less work to satisfy the second request if the server already knows the result of the first query. By reusing the same query object, the server has this knowledge and can optimize performance. If, instead, the conventional SQL approach is used, then the server has no way of knowing that the second data request is related in any way to the original request and must re-execute the query from scratch.

Of course, if there is no relationship between two data requests, there is no point in reusing the same query object. In this case, the client simply closes the cursor (219), and being not finished with the data (decision point 221), loops back to step 211 to create a separate query object, so that there has been one query object per request. To finish operations (from decision point 221), the data provider is closed (step 223), and then the metadata provider is closed (step 225).

OLAP queries can be so complex the OLAP queries must often be defined in terms of smaller, easier to understand queries that are combined together. For example, a seemingly simple cube-state query is often made up of smaller queries that define selections for corresponding dimensions. Any one of these selections may be defined by dozens of complex steps, and any given step may use an expression defined in terms of some other cube. For example, an analyst may ask for all products for which the total sales value is greater than the average sales value in some previously defined cube. For this approach to work in practice, each of the "sub-queries" must be able to be modified while still remaining part of the larger query. In other words, the sub-queries must be able to change state. Accordingly, embodiments of the present invention permit a sub-query, such as product selection steps, to be modified without having to change anything that was built in terms of it. All that happens is that the state of the query that defines the first step is changed.

Multidimensional Metadata Model

There are many providers of metadata, each defining its own metadata models. Unfortunately, these providers are largely incompatible with each other. Even within Oracle Corp., there are several competing metadata models including: the Oracle Data Dictionary (a set of tables in an Oracle database containing information about the available tables), the End User Layer (EUL), a C++ API, the Common Warehouse Metadata (a project sponsored by a consortium of database providers), etc.

Accordingly, one embodiment of the present invention provides an architecture that is capable of using a variety of existing metadata models, giving access to the metadata stored therein. In particular, the OLAP API 103's ability to access the metadata stored in many formats fulfils two conditions: (1) the OLAP application 101 can define and execute OLAP queries on the data described in the metadata; and (2) the OLAP application 101 can see either the full details of the underlying metadata model or the minimum metadata required to support query execution.

To satisfy condition (1) a simple metadata model is defined, which contains the minimum information required by the OLAP API 103 to define and execute queries. Thus, it is possible for any supported metadata model to be translated dynamically in the OLAP API 103 minimal metadata model by the OLAP server 105.

To satisfy condition (2), the concept of a metadata provider is introduced. A metadata provider is an interface that guarantees the OLAP application 101 access to the metadata required for defining and executing queries. Various metadata providers can be implemented, one for the simple metadata model and others for more sophisticated metadata models. The OLAP application 101 can use a simple metadata provider to get a bare bones view of the metadata. The simple metadata provider allows the OLAP application 101 to get a metadata object by a unique identifier and to see a set of property values for that object. Once discovered, the metadata objects can form part of a data query.

Figure 3:
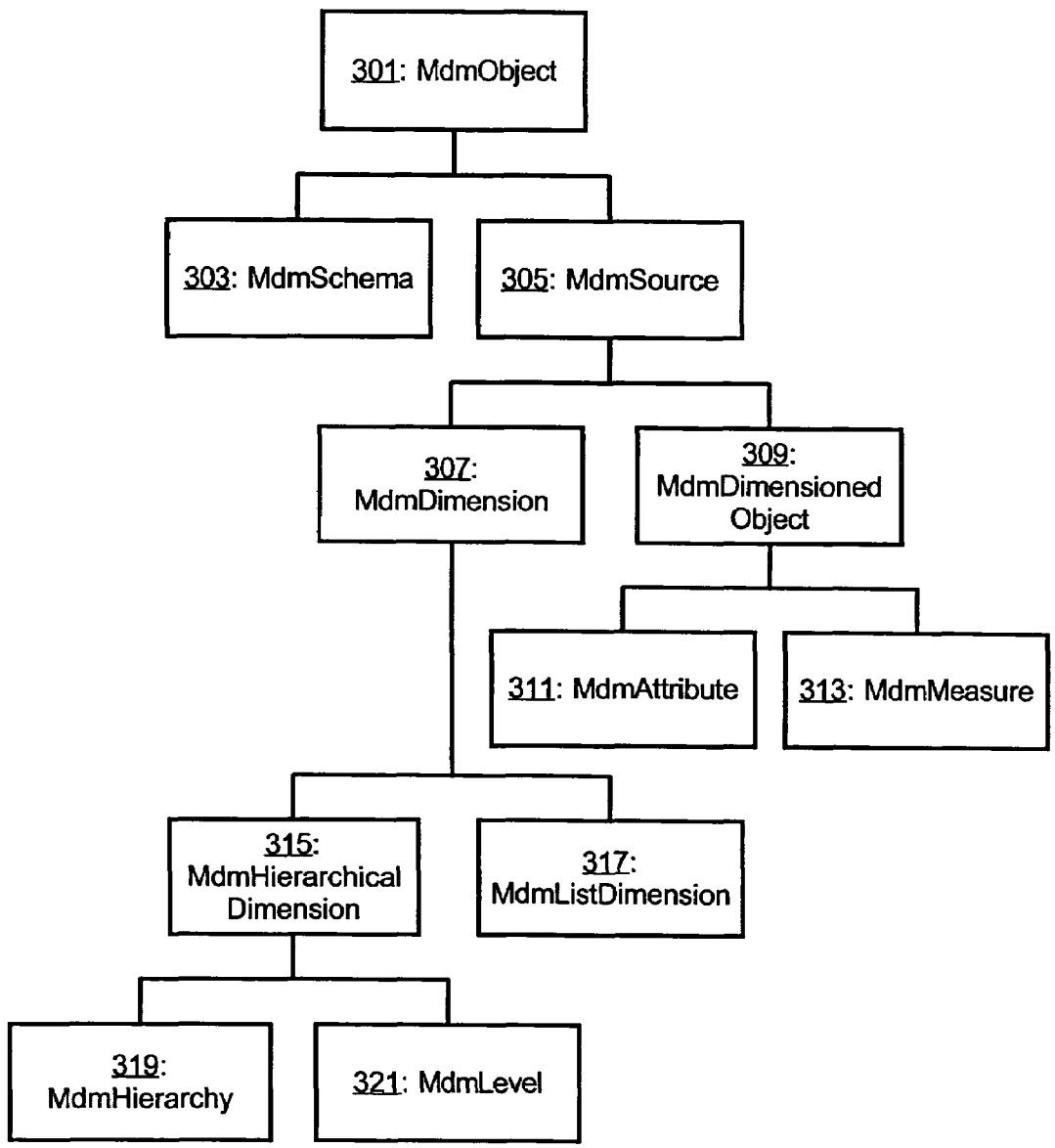
FIG. 3 depicts a metadata class hierarchy in accordance with an embodiment of the present invention.
Figure 4:
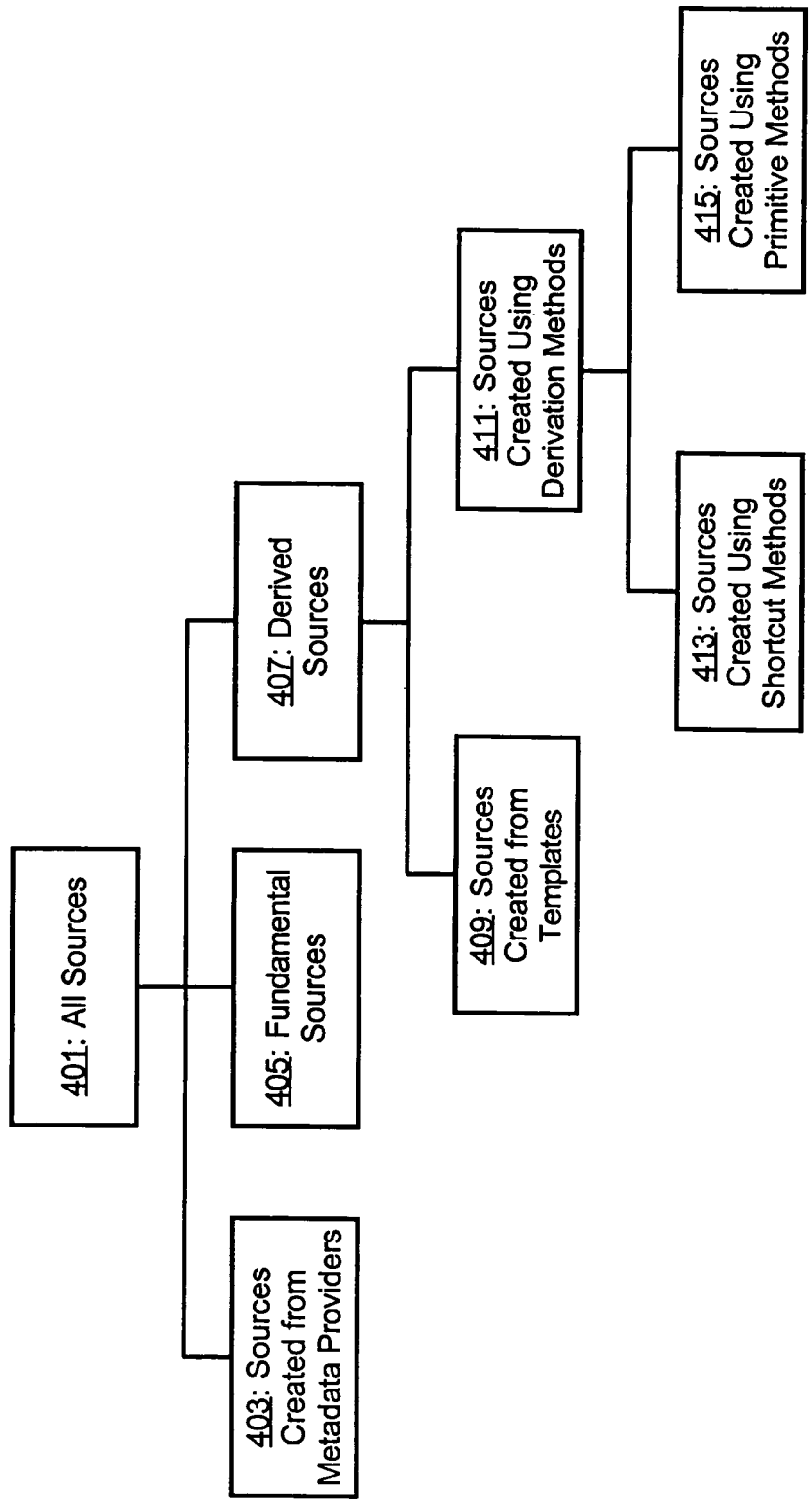
FIG. 4 depicts a schematic diagram for sources in one embodiment of the present invention.

A multidimensional metadata provider can be used to define a standard view of multidimensional data in terms of familiar concepts such as dimensions, measures, and hierarchies. A class hierarchy for one such multidimensional metadata model is illustrated in FIG. 3. Most of the classes implement metadata objects, such as dimensions and measures. The following list introduces the subclasses of an MdmObject 301 class.

The MdmObject 301 class has the following subclasses: MdmSchema 303 and MdmSource 305. The MdmSource 305 class has the following subclasses: MdmDimension 307 and MdmDimensionedObject 309. The MdmDimensionedObject 309 class has the following subclasses: MdmAttribute 311 and MdmMeasure 313. The MdmDimension 307 class has the following subclasses: MdmHierarchicalDimension 315 and MdmListDimension 317. The MdmHierarchicalDimension 315 class has the following subclasses: MdmHierarchy 319 and MdmLevel 321.

An application accesses metadata objects by creating an OLAP API 103 metadata provider and using the metadata provider to discover the available metadata objects in the data store 121. The metadata objects in the relational database 121 map directly to multidimensional metadata model objects that are accessible through the metadata provider. The objects typically map as follows: a dimension maps to MdmHierarchy 319 or MdmListDimension 317; a hierarchy maps to MdmHierarchy 319; a level maps to MdmLevel 321; a measure maps to MdmMeasure 313; an attribute maps to MdmAttribute 311; and a measure folder maps to MdmSchema 303.

An MdmSchema 303 represents a set of data that is used for navigational purposes. An MdmSchema 303 is a container for MdmMeasure 313, MdmDimension 307, and other MdmSchema 303 objects. An MdmSchema 303 is equivalent to a folder or directory that contains associated items. Despite the similarity in name, it does not correspond to a relational schema of a relational database. Instead, the MdmSchema 303 corresponds to a measure folder, which can include data from several relational schemas and which was created by a database administrator.

Data that is accessible through the OLAP API 103 is arranged under a top-level MdmSchema 303, which is referred to as the root MdmSchema 303. Under the root, there are one or more subschemas. To begin navigating the metadata, an application calls the getRootSchema method on the metadata provider. The root MdmSchema 303 contains all the MdmMeasure 313 and MdmDimension 307 objects that are in the relational database 121. That is, if the root MdmSchema 303 has subschemas that contain MdmMeasure 313 and MdmDimension 307 objects, the root MdmSchema 303 also contains those objects. An MdmSchema 303 has methods for getting all the MdmMeasure 313, MdmDimension 307, and MdmSchema 303 objects contained therein. The root MdmSchema 303 also has a method for getting the measure MdmDimension 307, whose elements are all the MdmMeasure 313 objects in the relational database 121.

An MdmSource 305 represents a measure, dimension, or other set of data (such as an attribute) that is used for analysis. This abstract class is the basis for some important multidimensional metadata model classes, such as MdmMeasure 313, MdmDimension 307, and MdmAttribute 311. MdmSource 305 objects represent data, but they need not provide the ability to create queries on that data. Their function is informational, recording the existence, structure, and characteristics of the data. They need not give access to the data values. In order to access the data values for a given MdmSource 305, the OLAP application 101 calls the getSource method on the MdmSource 305. This method returns a source through which the OLAP application 101 creates queries on the data represented by the MdmSource 305. A source that is the result of the getSource method on an MdmSource 305 is called a primary source. The OLAP application 101 creates new source objects from this primary source as it selects, calculates, and otherwise manipulates the data. Each new source specifies a new query.

An MdmDimension 307 represents a list of elements that can organize a set of data. For example, if there is a set of sales figures for a given year and they are organized by month, the list of months is a dimension of the sales data. The values of the month dimension act as indexes for identifying each particular value in the set of sales data.

In the OLAP API 103, the abstract MdmDimension 307 class represents the general concept of a list of elements that can organize data. MdmDimension 307 has an abstract subclass called MdmHierarchicalDimension 315, which represents a list that has hierarchical characteristics.

The following concrete subclasses of MdmDimension 307 represent the specific kinds of MdmDimension 307 objects that can be used in analysis: MdmLevel 321, MdmHierarchy 319, and MdmListDimension 317.

MdmLevel 321 represents a list of elements that supply one level of a hierarchical structure. Each element can have a parent and one or more children. The parents and children of a given MdmLevel 321 element are not within the given MdmLevel 321. They are elements of different MdmLevel 321 objects.

MdmHierarchy 319 represents a list of elements arranged in a hierarchical structure that has levels based on parent-child relationships. Each element can have a parent and one or more children, and all of these elements are within the MdmHierarchy 319. Though the parent and child elements are within the MdmHierarchy 319, they correspond to elements in MdmLevel objects. Therefore, loosely speaking, an MdmHierarchy 319 is composed of MdmLevel 321 objects. Some MdmHierarchy 319 objects are simply composed of MdmLevel 321 objects. Others are unions of one or more subordinate MdmHierarchy 319 objects, which in turn, are composed of MdmLevel 321 objects.

MdmListDimension 317 represents a simple list of elements that play no part in any hierarchical structure. The elements have no parents and no children. Both MdmLevel 321 and MdmHierarchy 319 are concrete subclasses of the abstract MdmHierarchicalDimension class.

An MdmDimension 307 can have one or more MdmAttribute 311 objects. Each of these MdmAttribute 311 objects maps the elements of the MdmDimension 307 to values representing some characteristic of the elements. To obtain the MdmAttribute 311 objects for a given MdmDimension 307, its getAttributes method may be invoked.

An MdmDimension 307 has an MdmDimensionDefinition (not shown), which represents the structure of the underlying data, and an MdmDimensionMemberType (not shown), which represents the basic nature of the elements. These two objects hold important information about the MdmDimension to which they belong. For a given MdmDimension 307, the getDefinition and getMemberType methods are used to obtain these related objects.

More specifically, an MdmDimensionDefinition indicates the structure of the underlying data on which the MdmDimension 307 is based. The MdmDimensionDefinition class is abstract. Therefore, instances are of the following subclasses: (1) MdmBaseDimensionDefinition, which indicates that the MdmDimension 307 has underlying data structured as a single list (e.g. an MdmLevel 321 is often based on a single column in a relational table in the relational database 121); MdmUnionDimensionDefinition, which indicates that the MdmDimension 307 has underlying data structured as the union of two or more lists (e.g. an MdmHierarchy 319 can be based on two or more columns in a relational table, one column for each MdmLevel 321); and MdmAliasDimensionDefinition, which indicates that the MdmDimension 307 acts as a proxy (that is, an alias) for another MdmDimension 307.

An MdmDimension 307 that has an MdmUnionDimensionDefinition has regions. A region of a given MdmDimension 307 is another MdmDimension 307 that represents a subset of the elements of the given MdmDimension 307. For example, an MdmDimension 307 for calendar year might have one region that represents quarters and another region that represents months. To obtain the regions of an MdmDimension 307, a getRegions method on its MdmUnionDimensionDefinition may be called.

An MdmDimensionMemberType indicates the basic nature of the elements in the MdmDimension 307. It holds a description for each element, and it often provides methods for finding out other information about individual elements. The MdmDimensionMemberType class is abstract. Therefore, instances are always one of the following subclasses: (1) MdmTimeMemberType, which indicates that the MdmDimension 307 elements represent time periods (an MdmTimeMemberType has methods for finding out the end date and time span for each element); MdmMeasureMemberType, which indicates that the MdmDimension 307 elements are all the MdmMeasure objects in the data store. There is only one MdmDimension 307 with an MdmMeasureMemberType, and it is referred to as the measure MdmDimension 307 (the measure MdmDimension 307 can be obtained by calling the getMeasureDimension method on the root MdmSchema); and MdmStandardMemberType, which indicates that the MdmDimension 307 elements have no specific characteristics. Most MdmDimension 307 objects have an MdmStandardMemberType.

An MdmLevel 321 is an MdmHierarchicalDimension 315 whose parents and children are elements from other MdmLevel 321 objects. The elements from a given MdmLevel 321 correspond to a subset of the elements in an MdmHierarchy 319. A given MdmLevel 321 is typically based on a level that was specified a column in a database table to provide the elements for the level. Even though the elements of an MdmLevel 321 have parent-child relationships, an MdmLevel 321 is represented as a simple list. The parent-child relationships among the elements are recorded in the parent and ancestors attributes, which can be obtained by calling the getParentRelation and getAncestorsRelation methods on the MdmLevel 321. Sometimes the parent and ancestors attributes are referred to as parent and ancestors relations. Typically, an MdmLevel 321 has an MdmBaseDimensionDefinition, because the underlying data is structured as a single list.

The list of elements in an MdmLevel 321 includes only the elements in that one level. The values of the elements must be unique. However, uniqueness can be achieved by a database administrator who defines the level using two relational columns. For example, a level that represents cities can be defined in the relational database based on both the city column and the state column. This makes it possible for the value "Springfield" to appear for two different elements in the city level: one appears for Springfield, Ill. and another appears for Springfield, Mass. The following list includes the elements for an MdmLevel 321 called mdmQuarter, which records the three-month quarters for a level MdmHierarchy called mdmTimesDimCalHier. This MdmHierarchy 319 covers four years, so the number of elements in mdmQuarter is 16. Specifically, the elements of mdmQuarter include: 1998-Q1, 1998-Q2, 1998-Q3, 1998-Q4, etc.

An MdmHierarchy 319 is an MdmHierarchicalDimension 315 that includes all the elements of one or more hierarchical structures. That is, all the parents and children are within the MdmHierarchy 319. Even though the parent-child relationships exist in the MdmHierarchy 319, its elements are represented as a simple list. The relationships among the elements are recorded in the parent and ancestors attributes, which can be obtained by calling the getParentRelation and getAncestorsRelation methods on the MdmHierarchy 319. You can obtain the region for each element by calling the getRegionAttribute method on the MdmDimensionDefinition of the MdmHierarchy 319. Sometimes the parent, ancestors, and region attributes are referred to as parent, ancestors, and region relations.

Typically, an MdmHierarchy is one of the following two types: (1) Level MdmHierarchy or (2) Union MdmHierarchy.

A level MdmHierarchy represents a hierarchical structure whose regions are MdmLevel 321 objects. For example, a level MdmHierarchy for calendar year might have as its regions MdmLevel 321 objects for year, quarter, month and day. A level MdmHierarchy has an MdmUnionDimensionDefinition, and its regions are MdmLevel 321 objects. The return value from its getHierarchyType method is LEVEL_HIERARCHY. A level MdmHierarchy is based on a hierarchy that was defined by a database administrator in the relational database 121.

A union MdmHierarchy represents a dimension that has one or more subordinate hierarchical structures. These structures are represented by one or more level MdmHierarchy 319 objects. An example of an MdmHierarchy 319 with two structures is a union MdmHierarchy for time that has two regions, one for the calendar year and another for the fiscal year. Each region is a level MdmHierarchy. A union MdmHierarchy has an MdmUnionDimensionDefinition and its regions are MdmHierarchy 319 objects. The return value from its getHierarchyType method is UNION_HIERARCHY. A union MdmHierarchy is based on a dimension that was defined as having one or more hierarchies in the relational database 121.

An MdmListDimension 317 is a simple list of elements that have no hierarchical characteristics. That is, the notion of having a parent or a child is not relevant for the elements of an MdmListDimension 317. A given MdmListDimension 317 is based on a dimension that was specified as having a single level and no hierarchy in the relational database 121. One example of an MdmListDimension 317 would be a list of colors.

An MdmMeasure 313 represents a set of data that is organized by one or more MdmDimension 307 objects. The structure of the data is similar to that of a multidimensional array. Like the dimensions of an array, the MdmDimension 307 objects that organize an MdmMeasure 313 provide the indexes for identifying individual cells. For example, suppose there is an MdmMeasure 313 for sales data, and the data is organized by product, time, customer, and channel (with channel representing the marketing method, such as direct or indirect). This data can be thought of as occupying a four-dimensional array with the product, time, customer and channel dimensions providing the organizational structure. The values of these four dimensions are indexes for identifying each particular cell in the array, which contains a single sales value. A value is specified for each dimension in order to identify a value in the array. In relational terms, the MdmDimension 307 objects constitute a compound (that is, composite) primary key for the MdmMeasure 313. The values of an MdmMeasure 313 are usually numeric, but this is not necessary.

A given MdmMeasure 313 is based on an OLAP measure that was created by a database administrator in the relational database 121. In most cases, a column in a fact table is specified to act as the basis for the OLAP measure (alternatively, a mathematical calculation or a data transformation may be specified). In many but not all cases, at least one hierarchy for each of the measure's OLAP dimensions, as well as an aggregation method, is specified. OLAP services 105 uses all of this information to identify the number of elements in the MdmMeasure 313 and the value of each element.

MdmMeasure 313 elements are determined by MdmDimension 307 elements. The set of elements that are in an MdmMeasure 313 is determined by the structure of its MdmDimension 307 objects. That is, each element of an MdmMeasure 313 is identified by a unique combination of elements from its MdmDimension 307 objects. Typically, the MdmDimension 307 objects of an MdmMeasure 313 are union MdmHierarchy objects. That is, they have at least one hierarchical structure. It is important to remember that the elements of a union MdmHierarchy include all of the leaves and all of the nodes for all of the level MdmHierarchy objects that represent its regions. Because of this structure, the values of the elements of an MdmMeasure 313 are of two kinds: (1) values from the fact table column (or fact-table calculation) on which the MdmMeasure 313 is based (these values belong to MdmMeasure 313 elements that are identified by a combination of leaf MdmHierarchy 319 elements) or (2) aggregated values that OLAP services 105 has provided (these values belong to MdmMeasure 313 elements that are identified by at least one node element from an MdmHierarchy 319). The method for aggregation (for example, addition) was specified in the relational database 121.

An MdmAttribute 311 represents a particular characteristic of the elements of an MdmDimension 307. An MdmAttribute 311 maps one element of the MdmDimension 307 to a particular value. A typical example is an MdmAttribute 311 that records the gender of each customer in an MdmDimension 307 called mdmCustomersDim. In this case, the elements of the MdmAttribute 311 have the values "Female" and "Male". The values of an MdmAttribute 311 might be String values (such as "Female"), numeric values (such as 45), or objects (such as MdmLevel 321 objects). Like an MdmMeasure 313, an MdmAttribute 311 has elements that are organized by its MdmDimension 307. For example, the gender MdmAttribute has one element (with "Female" or "Male" as its value) for each element of the MdmDimension 307 called mdmCustomersDim.

Typically, not all of the elements of an MdmDimension 307 have meaningful mappings to the values of a given MdmAttribute 311. For example, the gender MdmAttribute applies only to the lowest level of mdmCustomersDim, because gender makes no sense for higher levels such as cities or states. If an MdmAttribute 311 does not apply to some elements of an MdmDimension 307, then their MdmAttribute 311 values are null. Some MdmAttribute 311 objects provide a mapping that is one-to-many, rather than one-to-one. Therefore, a given element in an MdmDimension 307 might map to a whole set of MdmAttribute 311 elements. For example, the MdmAttribute 311 that serves as the ancestors attribute for an MdmHierarchy 319 maps each MdmHierarchy 319 element to its set of ancestor MdmHierarchy 319 elements.

Building Queries from Sources

In one aspect of the invention, queries are represented by two objects: source objects and cursor objects. The specification for a query is represented by a source object. Source objects are not actual result sets but merely describe the data to be retrieved. The result set of a query is a cursor object. Cursor objects are the objects that are used to actually retrieve data from the database.

Source objects are immutable. A source object cannot be changed once it has been created. When it is desirable to present a source object as changeable to the OLAP application 101 (for example, to support what-if analysis), a template object is provided to define the source object. As described in greater detail herein below, template objects themselves have state and can be modified at any time.

A source class has different subclasses for different data types. Each of the subclasses defines methods that are type-specific versions of various source methods and methods that perform type-specific operations. For example, a "BooleanSource" contains Boolean values, and a "DateSource" contains date objects.

In one embodiment, the OLAP API 103 supports the following kinds of source 401 objects: (1) a primary source 403, which corresponds to and has a structure similar to a metadata object from which the primary source 403 created; (2) a fundamental source 405 object, which represents data types and functions that are intrinsic to the OLAP API 103; and (3) a derived source 407, which is created by manipulating existing source objects. Constant, list, and range source objects are simple, nondimensional source objects that can be used as operands when making selections and calculations. Since a source is an object, an object reference to the source must be obtained in order to use the source, and the way in which the object reference to a source is obtained varies by the kind of source.

A primary source 403 object is created via a getSource method on a metadata object. A primary source 403 that created from an MdmDimension 307 is a specification for a simple list of elements. This kind of source does not have any keys itself but usually acts as a key to other source objects. A primary source 403 created from an MdmDimension 307 is called a nondimensional source. It can be thought of as a table with only a single column that holds the values of its elements.

A primary source 403 created from an MdmMeasure 313 or an MdmAttribute 311 is a specification for a data set that has one or more keys. Each of these keys is a primary source 403 that was created from a MdmDimension 307. In other words, this kind of source represents a set of data that is organized by one or more primary source 403 objects that have been created from MdmDimension objects 307. A primary source 403 created from an MdmMeasure 313 or an MdmAttribute 311 can be conceptualized as a multidimensional array. The source objects that were created from MdmDimension 307 objects and that act as its keys are the dimensions of the array. The values of its dimensions are indexes for identifying each particular cell in the array, which contains a single value. In order to identify a value in the array, a value for each dimension must be specified. Thus, the set of elements that are in a dimensional source is determined by the structure of the source objects that act as its keys.

A source that is created from an MdmMeasure 313 or an MdmAttribute 311 can also be conceptualized in relational terms as a table that has one column for its elements and one column for the elements of each of the source objects that act as its keys. A source object that is a key to another source is often a primary key in a table in the underlying database. Consequently, when one source is a key to another source, the source that is the key can be thought of as a foreign key. When a source has foreign keys, the primary key of the source is a composite key (or multisegmented key) that comprises its foreign keys. Each element of one source is identified by a set of elements of the source objects that are its foreign keys.

The source objects that act as the keys of a dimensional primary source are known as "inputs." An input is a foreign key to a source object for which values have not yet been specified. A source object that has an input knows the identity and characteristics of the input source but does not know the values of the elements of the input. As a result, when a source has inputs, the primary keys to its elements are not fully specified and the OLAP service 105 cannot identify the elements of the source. Thus, a query specification represented by a source that still has an input is incomplete. Consequently, a cursor cannot be created on a primary source and, therefore, its values cannot be retrieved into the OLAP application 101. To retrieve the values represented by a dimensional primary source, a new source must be derived from it by specifying elements for the values of the source objects that act as its keys as described hereinafter.

Creating Derived Sources

New source objects 407 can be created from existing source objects by using the methods in the source class and its subclasses or by using the generateSource method in the template class. Template objects are features of the OLAP API 103 that represent end-user concepts such as cubes, edges, and selections. Template objects form a bridge between the requirements of the user interface and the powerful, but abstract, OLAP API 103 logical model. Unlike other OLAP API 103 objects, template objects have mutable state. Consequently, template objects can be modified at any time, even after having been incorporated into some larger source. The source 409 defined by a template is dynamic in the sense that it can be changed. More information about templates is described hereinafter.

In one embodiment, the OLAP API 103 includes primitive methods and shortcut methods for deriving new source 413 and 415 objects, respectively. The primitive "join" method is perhaps the single most important source creation method in the OLAP API 103. The primitive join method combines the elements of the "this" source (sometimes called the "base source") and another source (called the "joined source") and filters this result set using a third source (called the "comparison source") in the specified manner. Using an optional parameter, the primitive join method can be used to add the joined source as a dimension (or key) to the new source. Implementations of the OLAP API 103 may provide various shortcut and convenience methods that can be used instead of the primitive join method.

Other primitive methods include: "alias" for creating a new source object that is the same as the base source object, but that has the base source as its type; "distinct" for removes the duplicate rows (tuples) in this source object; "extract" for creating a new source that has the base source as an extraction input when the elements of the base Source are other Source objects; "position" for creating a new source object with the same structure as the base source and whose elements are the position of the elements of the base source; and "value" for creating a new source object that has the elements of the base source and that has the base source as an input.

The signature of the primitive join method is as follows: "Source join(Source joined, Source comparison, int comparisonRule, boolean visible)" where "joined" is the source that is to be joined to the base source, "comparison" is the source to be used as a filter for the join, "comparisonRule" is the rule that determines how the method uses the comparison source to filter the result set, and "visible" is a flag that specifies whether the joined source object is to be an output of the new source.

The value of the comparisonRule parameter can be COMPARISON_RULE_SELECT, COMPARISON_RULE_ASCENDING, or COMPARISON_RULE_DESCENDING. The COMPARISON_RULE_SELECT value specifies that the new source contains only those elements that appear in the comparison source. The COMPARISON_RULE_ASCENDING value, like the COMPARISON_RULE_SELECT value, specifies that the new source contains only those elements that appear in the comparison source, and additionally, once the rows of the cross-product have been intersected by the comparison source, that the remaining rows are sorted by the value of the joined source according to the position defined in the comparison source. The COMPARISON_RULE_DESCENDING value, like the COMPARISON_RULE_SELECT value, specifies that the new source contains only those elements that appear in the comparison source, and additionally, once the rows of the cross-product have been intersected by the comparison source, the remaining rows are sorted by the value of the joined source according to the reverse position defined in the comparison source. The COMPARISON_RULE_REMOVE value specifies that the new source created by a join contains only those elements that do not appear in the comparison source.

When true is specified for the visible flag, the joined source becomes a dimension of the new source and the values of the joined source become the elements of that dimension.

The result of the join method is a new source object 415. Depending on the complexity of the source objects that are being joined, the resulting source object may be simple or complex. When two nondimensional source objects are joined, the new source is dimensioned by the joined source and the new source is simply the cross-product of the two source objects. When dimensional Source objects are joined, the new source 415 has the combined dimensionality of the base, joined, and comparison source objects. Additionally, true is specified for the value of the visible parameter, the joined source becomes a dimension or key of the new source.

For example, let there be a source named myStates that does not have any inputs or outputs and whose elements are CA, MA, and NY and a source named myProducts that does not have any inputs or outputs and whose elements are Dresses—Girls and Shirts—Girls. Let the following code be issued:

String[ ] values=new String[ ] {"NY", "CA"};
Source newSource=myProducts.join(myStates, values, Source.COMPARISON_RULE_SELECT, true);

When processing this code, the OLAP service 105 takes the cross-product of myProducts and myStates, and then selects from the result only those rows for which the value of region is in the set of values {"NY", "CA"}. Another way of describing this processing is to say that the states output (column) is intersected with the comparison set {"NY", "CA"}. This yields the result set as follows: {("CA", "Dresses—Girls"), ("CA", "Shirts—Girls"), ("NY", "Dresses—Girls"), {"NY", "Shirts—Girls"}}. The result set, however does not contain any rows with "MA", which have been removed.

Selecting Data in Queries

Even though it helps to think of a source object as a tabular or dimensional result set, a source actually is not a result set. Instead, a source object is a specification for a query that defines a result set. As part of this specification, a source object keeps track of the keys for which values have been specified. Looking at keys from this point of view, a source object is said to have two different types of keys: inputs and outputs.

Inputs are keys for which values have not yet been specified. When a primary source object has other source objects that act as its keys, these source objects are always inputs. Thus, the query specification represented by a dimensioned primary source or any other source that has an input is incomplete. A cursor for this type of source cannot be created and, consequently, the query specified by the Source cannot be retrieved.

Outputs are keys for which values have been specified. When a source has only outputs, the primary key to its elements are fully specified. The query that this type of source specifies is determinable. A cursor for this type of source can be created and used to retrieve the data set specified by the source.

An input-output match is a correspondence between two sources involved in a join operation, whose correspondence acts as a filter on the elements of the new source. A join may have no input-output matches or many input-output matches. The rules for determining an input-output match are as follows:

(1) An input-output match can only occur between an "input" source and an "output" source if either (a) the input source equals the output source, or (b) the input source is a supertype of the output source in the sense that the input source can be reached by recursively following the type association starting from output.

(2) Given an input source, and another "startingpoint" source, the input source will match as follows: (a) if input source can match the startingpoint source according to rule (1), then the match is made; otherwise, (b) loop through the outputs of the startingpoint source, applying this rule recursively until a match is found.

(3) Each input of the base source is matched by applying rule (2) to the input with the joined source as the startingpoint source.

(4) Each input of the joined source is matched by applying rule (2) to the input with the base source as the startingpoint source.

In SQL terms, the input-output match generates a SQL "where" clause that compares the columns that correspond to the matched inputs and outputs.

To create a cursor on a Source object, all of the keys of the source must be outputs. Consequently, to display a primary dimensional source, values for the keys of that source must first be specified. Specifying values for the keys of a source is called changing inputs to outputs. The need to specify values for the keys of a dimensional source with inputs is so universal, that the OLAP API 103 has a join shortcut method to support it. To specify values for the keys of a dimensional source (thereby changing an input to an output), the following join method can be used, in which the original source is the source object that has the input to become an output and the joined source is the input you want to change: "join (Source joined)". This is a shortcut for the following join method: "join (joined, emptySource, Source. COMPARISON_RULE_REMOVE, true);". The comparison source is the empty source, which has no elements. Consequently, even though the COMPARISON_RULE_REMOVE constant is specified, no elements are removed as a result of the comparison. Also, because the visible flag is set to true, the joined source becomes an output of the new source. Additionally, since many of the methods of source class and its subclasses are actually shortcut and convenience methods that implicitly call the join method, some of these methods also change inputs to outputs.

The way a dimensional source is processed is determined by its structure. When a source has both inputs and outputs, its elements (tuples) are identified by the set of its input and output values. In this case, each set of possible input values typically identifies a number of elements (tuples). Within this subset of data, the tuples are arranged by output. When a source has inputs, many source methods work on this subset of data. For example, when a cursor is opened on a source, the OLAP service 105 loops over the outputs in order to produce the data, but OLAP service 105 (arbitrarily) qualifies away any of the inputs. Additionally, the OLAP service 105 loops over the outputs of a source when the source processes any aggregation methods like average and total. In this sense, moving a source from the list of inputs to the list of outputs is similar to moving a column out of the GROUP BY list in SQL.

The structure of a dimensioned source is determined by the order in which the inputs of the source are turned into outputs. The fastest-varying column is always the column that contains the elements of the source. For a source that has outputs, the first output that was created is the fastest-varying key column; the last output that was created is the slowest-varying key column.

When two join methods are strung together in a single statement, the first join (reading left to right) is processed first. Consequently, when creating a single statement containing several join methods, the input desired be the fastest-varying of the new source is the joined source in the first join in the statement. The inputs of a source can be retrieved using the getInputs method that the source class inherits from a DataDescriptor class. The outputs of a source can be retrieved using the getOutputs method that the source class inherits from the DataDescriptor class.

For example, let there be a primary source named unitCost that was created from a MdmMeasure object named mdmUnitCost. The source named unitCost has inputs of timesDim and productsDim, and no outputs. The timesDim and productsDim source objects do not have any inputs or outputs. The order in which the inputs of unitCost are turned into outputs determines the structure of a source on which you can create a cursor.

In one illustration, let the following code be issued to turn the inputs of the primary Source named unitCost into outputs:

Source newSource=unitCost.join(timesDim).join(productsDim);

This code strings two join methods together. Because unitCost.join(timesDim) is processed first, the key values for timesDim are the first key values specified. In other words, timesDim is the first output defined for the new source. After the first join is processed, the query specification represented by the resulting unnamed source consists of the name of its input (that is, productsDim) and both the name and the element values of its output (that is, timesDim).

After the second join is processed, the query specification represented by newSource comprises the names and the element values of both of its output (that is, timesDim and productsDim). Since timesDim was the first key for which values were specified, it is the fastest-varying output.

In another illustration, let the following code to turn the inputs of unitCost into outputs be issued:

Source newSource=unitCost.join(productsDim).join(timesDim);

This code strings two join methods together. Because unitCost.join(productsDim) is processed first, productsDim is the first output defined for the new source. Consequently, productsDim is the fastest-varying output.

Retrieving Results with a Cursor

A query is an OLAP API 103 source that specifies the data to be retrieved from the OLAP service 105 and any calculations the OLAP service 105 is to perform on that data. A cursor is the object that retrieves, or "fetches," the result set specified by a source.

Figure 5:
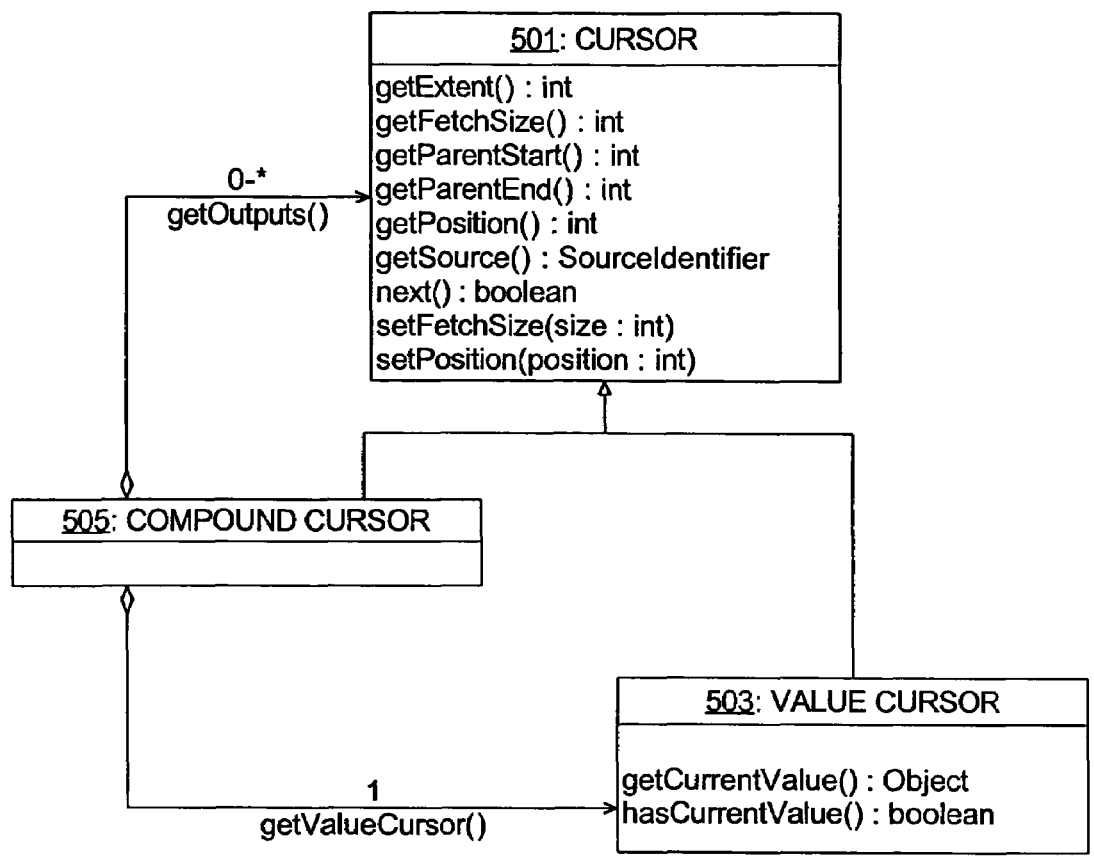
FIG. 5 is a class diagram for a cursor object according to one embodiment of the present invention.

Cursors are organized into tree-like structures similar to the sources that define a query. These structures are illustrated in FIG. 5, in which the cursor interface 501 encapsulates the notion of a current position and has methods for moving the current position. The cursor interface 501 has two subinterfaces: Value Cursor 503 and Compound Cursor 505. The OLAP API 103 has implementations of these subinterfaces. Calling a createCursor method returns either a Value Cursor 503 or a Compound Cursor 505 implementation, depending on the source for which the cursor is created.

A Value Cursor 503 is returned for a source that has a single set of values. A Value Cursor 503 has a value at its current position. A Value Cursor 503 has methods for getting the value at the current position.

A Compound Cursor 505 is created for a source that has more than one set of values, which is a Source that has one or more outputs. Each set of values of the source is represented by a child Value Cursor 503 of the Compound Cursor 505. A Compound Cursor has methods for getting its child cursor objects.

The structure of a source determines the corresponding structure of the cursor. A source can have nested outputs, which occurs when one or more of the outputs of the source is itself a source with outputs. If a source has a nested output, then the Compound Cursor 505 for that Source has a child Compound Cursor 505 for that nested output. The Compound Cursor 505 coordinates the positions of its child Cursor objects. The current position of the Compound Cursor 505 specifies one set of positions of its child Cursor objects.

The rules described above for deriving the cursor structure made use of the outputs of a source, but not the source's inputs. The reason for these rules is that cursors should not, in general, be created on sources with inputs. Sources can only have results if the input values have been specified, which can be done directly using the join method or indirectly through a template. In either case, applying the join or using the template that specifies the input causes the input to become an output. Opening a cursor on a source that still has inputs is considered equivalent, therefore, to not specifying all the input values. If this happens, various responses can be made in various implementations. For example, the unspecified inputs values can be arbitrarily set, or an exception can be thrown. In other words, there is no guarantee that the result obtained from a source with inputs remaining is repeatable and the result set obtained from such as source is undefined.

Cursors have something called a "current position," which identifies a single element (or cell) of the result set where the cursor is currently "located." This position can be changed by the client application in one of two ways: with sequential access or with random access. Under sequential access the OLAP application 101 starts with the beginning of the cursor (position =1) and moves through the result by repeatedly calling the next( ) method until the end of the result set is reached. This form of access is useful for printing the result of a query in a text format. Alternatively, under sequential access, the OLAP application 101 sets the current position to any valid location with the setPosition method. This feature is useful for user interface widgets like tables and graphs where the end user can use the scroll bars to view any region of the result set randomly.

Once the cursor is located at the desired position, the OLAP application 101 can get the value, or values, for that position. In general, this is one value for every value cursor 503 in the cursor tree. For a typical cube view, this translates into saying that each cell contains a value for the measure and a value for each dimension of the cube.

It is important to distinguish between the view of the data presented by the cursor and the view typically shown to an end user. FIG. 6A shows a typical end-user view of the data in a "cross-tab" format. In this view, each of the two dimensions is given its own "display region" (marked in bold here), in which the measure values have a separate display region (normal font). This may lead one to believe that there are 19 cells in the data set. In fact, there are only twelve. FIG. 6B shows these twelve cells as defined by the cursor. There is only one "display region," but each cell within this region contains multiple values: one for the column dimension, one for the row dimension, one for the measure, and a position.

The current value of any value cursor 503 can be obtained by calling either the getCurrentValue method, which returns an object, or one of the typed variants (not shown), such as getCurrentString or getCurrentDouble. These variants are more efficient than getCurrentValue, but they will fail if the current value is not of the specified type.

The "current position" of cells become more complicated when a compound cursor 505 is involved because the position is defined at many levels. The OLAP application 101 can set and get the position at every level of the cursor tree, and the OLAP API 103 coordinates these positions between the cursors so that all of the positions remain consistent no matter where the OLAP application 101 sets the position.

Cursors cannot be opened on empty result sets. For example, if the query specified by a source evaluates to nothing, then an exception is thrown when the OLAP application 101 tries to open such a cursor.

Virtual Cursors

The result sets of a query can be huge. Examples exist of real dimensions with over a million members. When these dimensions are used to define measures, the resulting cross-product can create cubes with billions of cells. Obviously, every cell of such a giant cube cannot be downloaded at the same time.

A OLAP API 103 cursor represents the entire result set for a source, but the cursor need retrieve only a portion of the result set at a time from the OLAP service 105. Accordingly, the virtual Cursor is managed in the OLAP service 105 so that results are retrieved from the OLAP service 105 only as the OLAP application 101 needs them. By managing the virtual Cursor in OLAP service 105, the OLTP application 101 is relieved of a substantial burden.

The amount of data that a Cursor retrieves in a single fetch operation is determined by a fetch size specified for the Cursor. For a Compound Cursor, the amount of data fetched in a single operation is the product of the fetch sizes of all of its descendent ValueCursor objects. The total set of values retrieved in a single fetch is the fetch block for the Cursor. The fetch sizes are determined in order to limit the amount of data the application needs to cache on the local computer and to maximize the efficiency of the fetch by customizing it to meet the needs of the OLTP application's method of displaying of the data.

A cursor has a local fetch size if the size of the fetch block is specified for that cursor. Not all of the cursor objects in a Compound Cursor can have local fetch sizes. The structure of a Compound Cursor is like a tree, with the hierarchy of cursor objects starting at the topmost (root) cursor and going down through all the child Cursor objects. Any path through the hierarchy, starting from the root and going down to a leaf Value Cursor, can contain one, and only one, cursor with a local fetch size. Specifying the fetch size on a parent cursor affects all of the child Cursor objects of that parent. This means that a fetch block can contain no more than the number of elements of each child cursor specified by the fetch size.

In a Compound Cursor, the levels at which the fetch sizes are set determine the shape of the fetch block of the Compound Cursor. The optimal fetch block for a Compound Cursor depends on the way the OLAP application 101 is to navigate the cursor and display the data. After determining how to display the data, the OLAP application 101 developer should do the following:

The OLAP application 101 developer should specify a fetch block that is large enough to contain all the data required for the portion of the result set that is being displayed in the user interface. For example, if the data in a table and the size of the window means that 25 rows are visible at a time, then the fetch block should contain at least 25 rows. If it is any smaller than this, the Cursor needs to make multiple trips to the OLAP service 105 to fill the display.

The OLAP application 101 developer should specify fetch sizes on the cursor objects that are used to loop through the result set. For example, for a table view, fetch sizes should be set on the root Cursor, and, for a cross-tab view, fetch sizes should be set on the child cursor objects.

The OLAP application 101 developer should keep the product of all of the fetch sizes relatively small because the product determines the total number of cells in the fetch block. If the product of all the fetch sizes is too large, then the advantages of the virtual cursor are lost.

Incremental Query Development Using Templates

The template class is the basis of a very powerful feature of the OLAP API 103. Template objects are to create modifiable source objects. With those source objects, dynamic queries can be incrementally changed in response to end-user selections. Template objects also offer a convenient way to translate user-interface elements into OLAP API 103 operations and objects.

The main feature of a template is its ability to produce a dynamic source. That ability is based on two of the other objects that a template uses: instances of the DynamicDefinition and MetadataState classes.

When a source is created, a SourceDefinition is automatically created. The SourceDefinition has information about how the source was created. Once created, the source and its SourceDefinition are paired immutably. The getSource method of a SourceDefinition gets its paired Source. DynamicDefinition is a subclass of SourceDefinition. A template creates a DynamicDefinition, which acts as a proxy for the SourceDefinition of the Source produced by the template. This means that instead of always getting the same immutably paired source, the getSource method on the DynamicDefinition gets whatever source is currently produced by the template. The instance of the DynamicDefinition does not change even though the Source that it gets is different.

The source that a template produces can change because the values, including other source objects, that the template uses to create the source can change. A template stores those values in a MetadataState. A template provides methods to get the current state of the MetadataState, to get or set a value, and to set the state. Those methods are used to change the data values the MetadataState stores.

The design of a template reflects the query-building elements of the user interface of an application. For example, suppose the OLAP application 101 is designed to allow the end user to create a query that requests a number of values from the top or bottom of a list of values. The values are from one dimension of a measure. The other dimensions of the measure are limited to single values.

The user interface of this OLAP application 101 has a dialog box that allows the end user to do the following: (1) select a radio button that specifies whether the data values should be from the top or bottom of the range of values; (2) select a measure from a drop-down list of measures; (3) select a number from a field (the number specifies the number of data values to display); and (4) select one of the dimensions of the measure as the base of the data values to display. For example, if the user selects the product dimension, then the query specifies some number of products from the top or bottom of the list of products. The list is determined by the measure and the selected values of the other dimensions.

The dialog box also allows the end user to click a button to bring up a Single Selections dialog box through which the end user selects the single values for the other dimensions of the selected measure. After selecting the values of the dimensions, the end user clicks an OK button on the second dialog box and returns to the first dialog box. There is also an OK button to generate the query. The results of the query appear in response to clicking on the OK button.

To generate a Source that represents the query that the end user creates in the first dialog box, a template called TopBottomTemplate may be designed. A second template, called SingleSelectionTemplate, may be used to create a source that represents the end user's selections of single values for the dimensions other than the base dimension. The designs of the template objects reflect the user interface elements of the dialog boxes.

In designing the TopBottomTemplate and its MetadataState and SourceGenerator, the following may be done:

(1) A class called TopBottomTemplate is created that extends the template. To the class, methods are added that get the current state of the template, set the values specified by the user, and then set the current state of the template.

(2) A class called TopBottomTemplateState is created that implements MetadataState. Fields are provided on the class to store values for the SourceGenerator to use in generating the source produced by the template. The values are set by methods of the TopBottomTemplate.

(3) A class called TopBottomTemplateGenerator is created that implements SourceGenerator. In the generateSource method of the class, the operations that create the source specified by the end user's selections are provided.

Running the OLAP application 101, an end user selects sales amount as the measure and products as the base dimension in the first dialog box. From the Single Selections dialog box, the end user selects customers from San Francisco, the first quarter of 2000, the direct channel, and billboard promotions as the single values for each of the remaining dimensions.

The query that the end user has created requests the ten products that have the highest total sales amount values of those sold through the direct sales channel to customers from San Francisco during the first calendar quarter of the year 2000 while a billboard promotion was occurring.

A DynamicDefinition is used to get the source produced by a Template. If the OLAP application 101 changes the state of the values that the template uses to create the source, for example, in response to end-user selections, then the OLAP application 101 uses the same DynamicDefinition to get the source again, even though the new source defines a result set different than the previous source.

The source produced by a template can be the result of a series of source operations that create other source objects, such as a series of selections, sorts, calculations, and joins. The code for those operations is placed in the generateSource method of a SourceGenerator for the template. That method returns the source produced by the template. The operations use the data stored in the MetadataState.

An extremely complex query may be built that involves the interactions of dynamic source objects produced by many different template objects. The end result of the query building is a source that defines the entire complex query. If the state of any one of the template objects that is used to create the final source is changed, then the final source represents a result set different than that of the previous source. Consequently, the final query can thereby be modified without having to reproduce all of the operations involved in defining the query.

Template objects can be designed to represent elements of the user interface of the OLAP application 101. The template objects turn the selections that the end user makes into OLAP API 103 query-building operations that produce a source. A cursor is then created to fetch the result set defined by the source from the OLAP service 105. Values from the cursor are fetched and displayed to the end user. When an end user makes changes to the selections, the state of the template is changed accordingly. Then the source produced by the template is obtained, a new cursor is created, and the new values are fetched and displayed.

Using Transactions

The OLAP API 103 is transactional. Each step in creating a query occurs in the context of a transaction. One of the first actions of an OLAP application 101 is to create a Transaction Provider. The Transaction Provider provides transaction objects to the application.

The Transaction Provider ensures the following: (1) A transaction is isolated from other Transaction objects. Operations performed in a Transaction are not visible in, and do not affect, other Transaction objects. (2) If an operation in a transaction fails, its effects are undone (the transaction is rolled back). (3) The effects of a completed transaction persist.

When a derived source is created by calling a method on another source, that derived source is created in the context of the current transaction. The derived source is active in the transaction in which it is created or in a child transaction of that transaction.

The current transaction can be set or gotten, or a child Transaction begun, by calling methods on a Transaction Provider. In a child transaction, the state of a template created in a parent transaction can be changed. By displaying the data specified by the source produced by the template in the parent transaction and also displaying the data specified by the source produced by the template in the child transaction, the end user of the OLAP application 101 is provided with the means of performing what-if analysis.

The OLAP API 103 has the following two types of transaction objects: a read transaction and a write transaction. Initially, the current transaction is a read transaction. A read transaction is required for creating a cursor to fetch data from an OLAP service 105. A write transaction is required for creating a derived source or for changing the state of a template.

In the initial read transaction, if a derived Source is created or if the state of a template object is changed, then a child write transaction is automatically generated. That child Transaction becomes the current transaction.

If another derived Source is then created or if the template state is changed again, that operation occurs in the same write transaction. Any number of derived source objects can be created, or any number of template state changes can be made, in that same write transaction. These source objects, or the source produced by the template, can be used to define a complex query.

Before a cursor can be created to fetch the result set specified by a derived source, the source is moved from the child write transaction into the parent read transaction. To do so, the transaction is prepared and committed.

To move a source that was created in a child transaction into the parent read transaction, the prepareCurrentTransaction and commitCurrentTransaction methods may be called on the Transaction Provider. When a child write transaction is committed, a source that was created in the child transaction moves into the parent read transaction. The child transaction then disappears and the parent transaction becomes the current transaction. The source is active in the current read transaction and can therefore be used to create a Cursor for it.

Getting and setting the current transaction, beginning a child transaction, and rolling back a transaction are operations that are used to allow an end user to make different selections starting from a given state of a dynamic query. This creating of alternatives based on an initial state is known as what-if analysis.

To present the end user with alternatives based on the same initial query, the following may be done: (1) A template is created in a parent transaction and the initial state is set for the template. (2) The source is produced by the template, from which a cursor is created to retrieve the result set, and values are obtained from the cursor and then displayed to the end user. (3) A child transaction is begun and the state of the template is modified. (4) The source is produced by the template, from which a cursor is created to retrieve the result set, and values are obtained from the cursor and then displayed to the end user. The first template state can be replaced with the second one or the second one can be discarded and the first retained.

To begin a child transaction, a beginSubtransaction method is provided on the Transaction Provider. Initially, the child transaction is a read transaction. If the state of the Template is changed, a child write transaction begins automatically. The write Transaction is a child of the child read Transaction.

To get the data specified by the source produced by the template, the write transaction is prepared and committed into its parent read transaction. A cursor can then be created to fetch the data. The changed state of the template is not visible in the original parent. The changed state does not become visible in the parent until the child read transaction is prepared and committed into the parent read Transaction.

After beginning a child read transaction, a child read transaction of that child or a grandchild of the initial parent transaction can be begun.

A transaction can be rolled back or undone by a rollbackCurrentTransaction method on the Transaction Provider. Rolling back a transaction discards any changes made during that transaction and makes the transaction disappear. After rolling back a transaction, any source objects created or template state changes made in the transaction are no longer valid. Any cursor objects created for those source objects are also invalid. Once a transaction is rolled back, that transaction cannot be prepared and committed. Likewise, once a transaction is committed, it cannot be rolled back.

Hardware Overview

Figure 7:
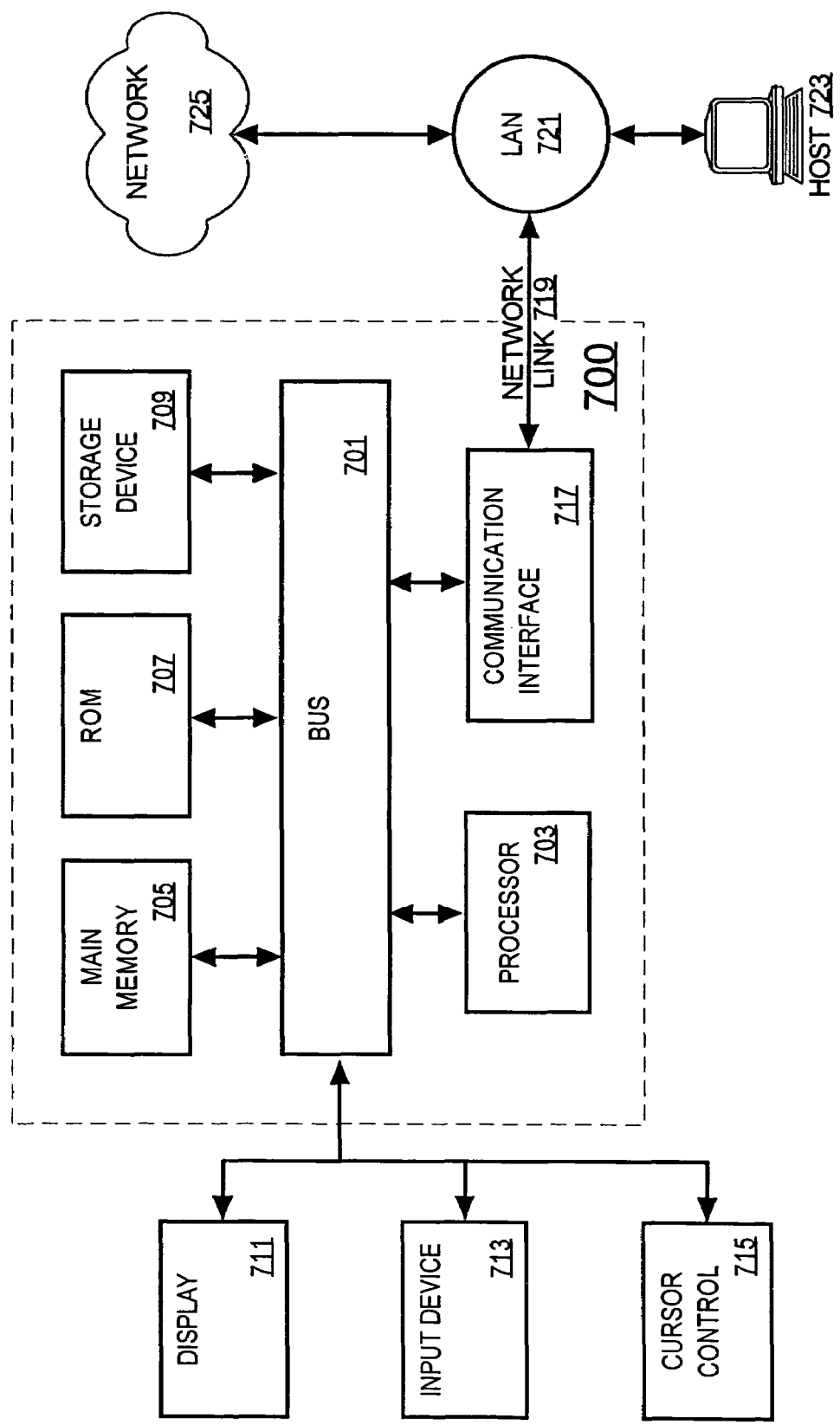
FIG. 7 depicts a computer system that can be used to implement an embodiment of the present invention.

FIG. 7 illustrates a computer system 700 upon which an embodiment according to the present invention can be implemented. The computer system 700 includes a bus 701 or other communication mechanism for communicating information, and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions to be executed by the processor 703. The computer system 700 further includes a read only memory (ROM) 707 or other static storage device coupled to the bus 701 for storing static information and instructions for the processor 703. A storage device 709, such as a magnetic disk or optical disk, is additionally coupled to the bus 701 for storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is cursor control 715, such as a mouse, a trackball, or cursor direction keys for communicating direction information and command selections to the processor 703 and for controlling cursor movement on the display 711.

According to one embodiment of the invention, data analysis is provided by the computer system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the present invention. Thus, embodiments of the present invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, or a telephone modem to provide a data communication connection to a corresponding type of telephone line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by service provider. The local network 721 and network 725 both use electrical, electromagnetic, or optical signals to convey information and instructions. The signals through the various networks and the signals on network link 719 and through communication interface 717, which communicate digital data with computer system 700, are exemplary forms of carrier waves bearing the information and instructions.

The computer system 700 can send messages and receive data, including program code, through the network(s), network link 719, and communication interface 717. In the Internet example, a server (not shown) might transmit requested code belonging to an application program for implementing an embodiment of the present invention through the network 725, local network 721 and communication interface 717. The processor 703 may execute the transmitted code while being received and/or store the code in storage device 709, or other non-volatile storage for later execution. In this manner, computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as storage device 709. Volatile media include dynamic memory, such as main memory 705. Transmission media include coaxial cables, copper wire and fiber optics, including the wires that comprise bus 701. Transmission media can also take the form of acoustic, optical, or electromagnetic waves, such as those generated during radio frequency (RE) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on a storage device either before or after execution by a processor.

While the present invention has been described in connection with a number of embodiments and implementations, the present invention is not so limited but covers various obvious modifications and equivalent arrangements, which fall within the purview of the appended claims.

What is claimed is:

1. A computer-implemented method for analyzing data comprising the steps of:
   receiving a call from an analytical processing application;
   constructing a query object based on the call;
   translating the query object into a textual query for submission to a data warehouse;
   retrieving data from the data warehouse in response to the submission of the textual query; and
   providing at least some of the data retrieved from the data warehouse in response to the textual query;
   wherein said providing at least some of the data retrieved includes: receiving a specification of an extent of a multidimensional cursor from the analytical processing application; and determining said at least some of the data based on the specification.

2. A computer-readable medium bearing instructions for analyzing data, said instructions being arranged, upon execution, to cause one or more processors to perform the steps of a method according to claim 1.

3. The method of claim 1, further comprising refining the query object by sub-transactions of transactions performed on a database.

4. The method of claim 3, wherein said refining the query object includes:
   generating a template of a source object based on metadata indicating a description of database data and database objects included in the data warehouse; and
   modifying the template based on a user input.

5. The method of claim 1, further comprising:
   receiving a refinement of the query object from the analytical processing application; and
   initiating a sub-transaction to process a refined query that corresponds to the refinement of the query object.

6. The method of claim 1, wherein said constructing the query object based on the call includes:
   generating a source object; and
   generating a cursor object,
   wherein the source object includes a specification for the query,
   wherein the cursor object includes a result of the query.

7. The method of claim 1, wherein said translating the query object into the textual query includes:
   matching an input with an output; and
   generating a source object including a specification for a result of a query,
   wherein the input includes a key having an unspecified value, and
   wherein the output includes a key having a specified value.

8. The method of claim 7, wherein said matching the input with the output includes determining whether the input is equal to the output.

9. The method of claim 1, wherein said determining at least some of the data includes:
   navigating to a database cell based on a position on an edge of a multidimensional result set; and
   fetching an amount of data based on the extent, wherein the fetched data corresponds to a portion of a response to the textual query.

10. The method of claim 1, further comprising:
    selectively rolling back at least one portion of a query associated with the query object.

* * * * *